United States Patent Office 3,456,907
Patented July 22, 1969

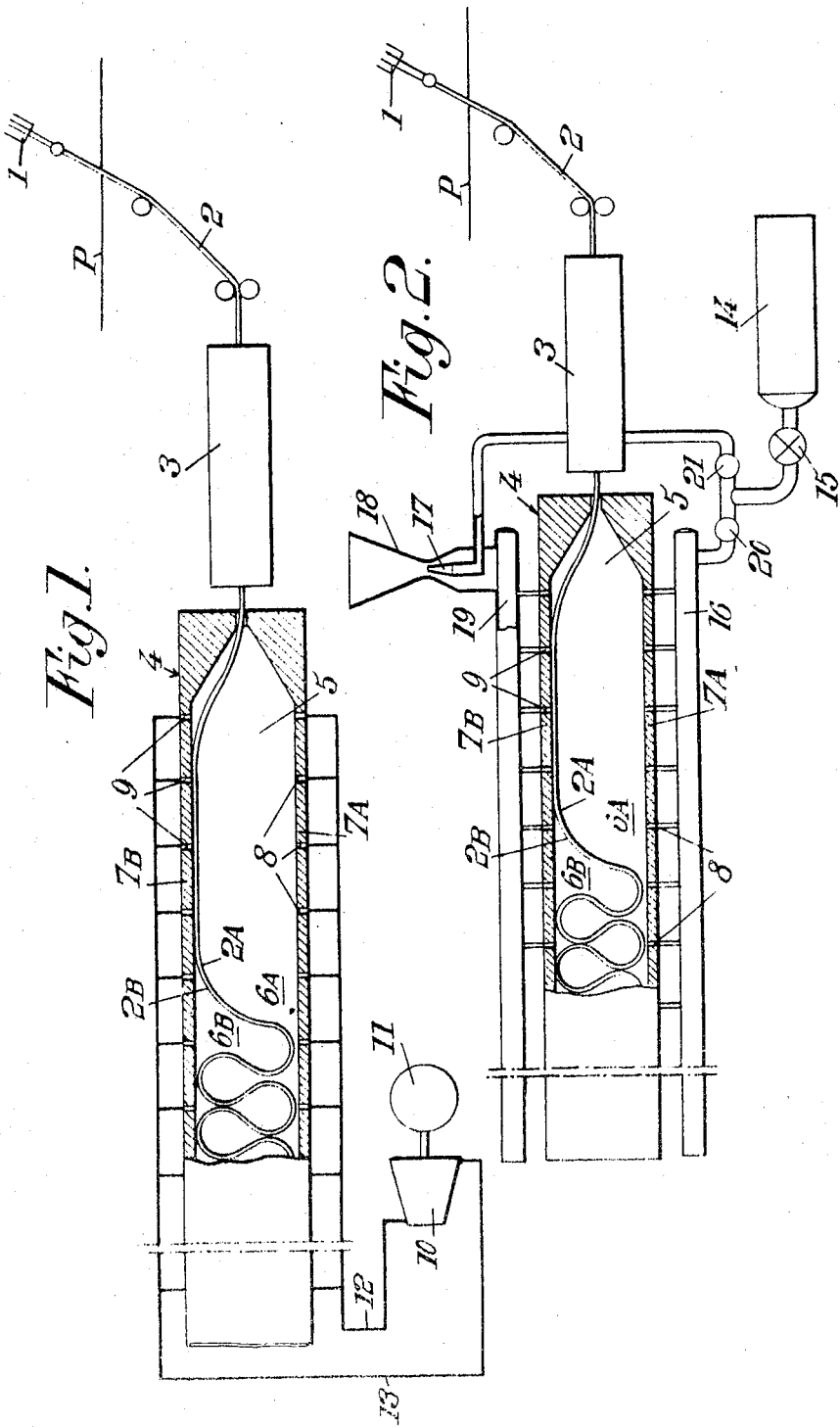

3,456,907
AIRCRAFT ARRESTING GEAR
Claude Louis Edouard Marcheron, Montrouge, France, assignor to Societe d'Exploitation des Materiels Hispano-Suiza, Bois-Colombes, France
Filed July 27, 1967, Ser. No. 656,390
Claims priority, application France, Oct. 28, 1966, 81,898
Int. Cl. B64c *25/44;* B64f *1/02*
U.S. Cl. 244—110                                                7 Claims

ABSTRACT OF THE DISCLOSURE

The arresting gear comprises an artificial obstacle adapted to drive, when it is engaged by an aircraft, a holding strap subjected to the action of a braking device. This strap is folded in a regular fashion in a box located upstream of the braking device. Means are provided for placing the portions of said box located on opposite sides of said strap under different pressures.

---

The present invention relates to vehicle arresting gears comprising an artificial obstacle secured to at least one holding strap or band passing through a stationary braking device, nearly the whole of the portion of said strap located upstream of said braking device being folded in a regular fashion into a package bearing through one edge of the strap on a fixed rigid flat support and having to unfold gradually before passing through said braking device, this arresting gear artificial obstacle being more especially intended to be placed across a landing field track to stop an aircraft running on said track.

In arresting gears of this kind, the unfolded part of the upstream portion of the strap undergoes, after the aircraft has struck the artificial obstacle, inertia forces which may have for their effect suddenly to bring, in a disorderly fashion, said part of the strap against the inlet of the braking device. This would produce a tangling of the strap which could no longer engage correctly into said braking device.

The object of the present invention is to provide an arresting gear which is better adapted than those existing at the present time to meet the requirements of practice and which prevents such tanglings of the strap at the inlet of the braking device.

The essential feature of the present invention is characterized in that, the upstream portion of the strap is housed in an elongated prismatic box of rectangular cross section, disposed at least substantially horizontally, the bottom of which constitutes the flat surface upon which said strap upstream portion bears through its lower edge, the width of which is equal to, or slightly greater than, the space occupied in the direction of width by said strap upstream portion, and the height of which is substantially equal to the height of the strap, said box being thus divided into two spaces corresponding respectively, to the two strap faces, and means are provided for placing, at least during the operation of the arresting gear, said two box spaces under different pressures, respectively.

The unfolded portion of the strap will thus be urged toward, then kept applied against, the side wall of the box located on the side of the strap where the pressure is lower than on the other side, thus subjecting the unfolded part of the strap to a friction which opposes the inertia tending to produce a tangling of the strap at the inlet of the braking device.

Preferred embodiments of the present invention will be hereinafter described with reference to the appended drawings given merely by way of example and in which, FIG. 1 is a diagrammatic plan view from the top, with portions cut away, of an arresting gear according to a first embodiment of the invention;

FIG. 2 is a view similar to FIG. 1 but corresponding to another embodiment.

The obstacle 1 may be of any suitable type consisting for instance of a cable or a net.

When an aircraft strikes said obstacle 1, the latter drives together with it at least one strap 2, and generally two such straps secured respectively to the ends of said obstacle 1 and disposed symmetrically with respect to the axis of the airfield track P.

In FIGS. 1 and 2, only one of these straps 2 has been shown.

Strap 2 is acted upon by a braking device 3 mounted in fixed position on the ground and preferably of the hydraulic type.

The upstream portion of this strap 2 is folded in a regular manner and rests through its lower edge upon a flat surface in such manner as to unfold gradually before passing through braking device 3.

According to the present invention, the upstream portion of strap 2 is housed in a prismatic box 4, of rectangular cross section, this box being disposed in an at least approximately horizontal position on the ground, the bottom 5 of this box constitutes the flat surface upon which bears the lower edge of the strap. The width of box 4 is equal to, or slightly greater than, the width of the strap package located therein. The height of box 4 is substantially equal to the height of strap 2, so that said box 4 is divided into two spaces $6_A$ and $6_B$ corresponding respectively to the opposed faces $2_A$ and $2_B$ of strap 2, and means are provided for placing said two spaces $6_A$ and $6_B$ under different pressures, respectively.

Thus, the unfolded part of strap 2 will be urged toward the side wall $7_B$ of box 4 located on the side $2_B$ of strap 2 exposed to the lower pressure, which will cause said unfolded portion of the strap to undergo a friction against side wall $7_B$ which will oppose the inertia tending to produce tangling of strap 2 at the inlet of braking device 3.

The respective values of the pressure $P_A$ and $P_B$ which must exist in spaces $6_A$ and $6_B$ to obtain an efficient braking may be calculated as follows;

Let $F_1$ be the inertia force which tends to urge the unfolded part of strap 2 toward braking device 3 and therefore to produce tangling of said strap at the inlet of said braking device. If $p$ is the weight of the strap per unit of length, $x$ the length of the part of the strap unfolded since the time an aircraft struck obstacle 1 (which unfolded part is located upstream of braking device 3), and $\gamma$ the negative acceleration imparted to said strap length $x$, the inertia force $F_1$ will be equal to:

$$F_1 = p.x.\gamma$$

If now $\Delta P$ is the pressure difference $P_A - P_B$ on the unfolded portion of a length equal to $x$, there will be exerted a perpendicular force $F_3$ which will be equal to:

$$F_3 = x.h.\Delta P$$

wherein $h$ designates the height of the strap.

If $f$ is the friction coefficient between strap 2 and side wall $7_A$ or $7_B$ of box 4, the friction force $F_4$ applied to the unfolded portion of length $x$ will be equal to:

$$F_4 = f.F_3 = f.x.h.\Delta P$$

The condition for avoiding tangling will then be, when neglecting the force due to the friction of the lower edge of strap 2 against the bottom wall 5 of box 4:

$$F_4 \geqslant F_1$$

that is to say, $$f.x.h.\Delta P \geqslant p.x.\gamma$$

or again, $$\Delta P \geq \frac{p \cdot \gamma}{f \cdot h}$$

By way of example, the following usual values may be given:

$p = 5$ kg./m.
$\gamma = 20$ m./s./s.
$f = 0.4$
$h = 0.5$ m.

In these conditions the value $\Delta P$ must be equal to or higher than 500 kg./m.$^2$ that is to say when 1/20 of an atmosphere, which is a value which can be maintained even if the fluid tightness between spaces $6_A$ and $6_B$ is not perfect.

The means for producing in spaces $6_A$ and $6_B$ respective pressures $P_A$ and $P_B$ the difference $\Delta P$ between which must have a value as above stated will now be described by way of example.

According to an embodiment, it is possible to provide, in one of the side walls of box 4, and over practically the whole length of said wall, a multiplicity of holes for introducing into the box a gas under pressure, the gaseous streams fed through said holes exerting, through their dynamic effect, a thrust on the portion of the strap corresponding to said portion of the side wall.

According to another embodiment, there is provided, in one of the box side walls and over practically the whole length thereof, a series of holes through which a gas present in the corresponding space of the box is sucked-out, the suction effect becoming greater and greater as the strap unfolded portion is urged toward the side wall provided with said holes.

Preferably both arrangements are used simultaneously, as shown by FIGS. 1 and 2.

In this case a gas under pressure is fed through holes 8 provided in side wall $7_A$ of box 4 and the gas present in space $6_B$ is sucked out through holes 9 provided in side wall $7_B$.

Thus the dynamic effect of the gas streams fed through holes 8 and the suction effect produced through holes 9 are combined together.

In the embodiment of FIG. 1 a compressor 10 driven by a motor 11 feeds through delivery conduit 12 a gas under pressure to the holes 8 of sidewall $7_A$, whereas the suction conduit 13 of compressor 10 is connected with the holes 9 of side wall $7_B$, thus extracting gas from the space $6_B$ of box 4.

In the embodiment of FIG. 2 a compressed gas tank 14 (the compressed gas being generally air) is connected, through a valve 15, on the one hand, to a high pressure header 16 for feeding the holes 8 of the side wall $7_A$ of box 4, and, on the other hand, to the jet 17 of an ejector 18 sucking out, through low pressure header 19 and the holes 9 of side wall $7_B$, the gas present in the space $6_B$ of box 4.

Two pressure reducing valves 20 and 21 may be provided for separately adjusting pressure $P_A$ and pressure $P_B$ existing respectively in spaces $6_A$ and $6_B$.

Such an embodiment is particularly advantageous because it includes only static elements, extremely simple, and the operation of which is very safe.

In a general manner, while the above description discloses preferred embodiments of the invention, it should be well understood that it is not to be limited thereto as there might be changes made in the arrangement, disposition and form of the parts.

What I claim is:
1. An arresting gear for vehicles running on the ground which comprises, in combination,
 an artificial obstacle for said vehicles,
 a strap secured to one end of said obstacle,
 a braking device for said strap which passes through said braking device, said braking device being stationary with respect to the ground,
 most of the portion of said strap on the side of said braking device opposite from the obstacle being folded in zig-zag fashion,
 a prismatic box of rectangular cross section for housing said folded strap portion, said box extending in a substantially horizontal direction,
 two opposed walls of said box forming parallel flat surfaces against which are applied the respective edges of said strap upstream portion, so that said strap divides the inside of said box into two spaces, and
 means for placing said box spaces under different pressures, respectively.

2. An arresting gear according to claim 1, wherein a third box wall is provided with holes distributed along practically the whole length of said third box wall and a fourth box wall is provided with holes distributed along practically the whole length of said fourth box wall,
 said means being adapted to feed a gas under pressure through the holes of said third wall and to suck out gas from the space of said box limited by said fourth wall.

3. An arresting gear according to claim 2, wherein said means comprise
 a motor,
 a compressor driven by said motor and having an input and an output,
 pipe means for connecting the output of said compressor with the holes of said third wall, and
 pipe means for connecting the input of said compressor with the holes of said fourth wall.

4. An arresting gear according to claim 2, wherein said means comprise
 a compressed gas tank,
 pipe means for connecting said tank with said third wall holes,
 a gas ejector including a choke tube and a jet opening into the throat of said choke tube,
 pipe means for connecting said ejector choke tube with the holes of said fourth tube, and
 conduit means for connecting said compressed gas tank with said jet.

5. An arresting gear according to claim 4, further comprising
 a pressure reducing valve in the pipe means for connecting said compressed gas tank with said third wall holes, and
 a pressure reducing valve in the conduit means for connecting said compressed gas tank with said jet.

6. An arresting gear according to claim 1, wherein another box wall is provided with holes distributed along practically the whole length of said last mentioned box wall,
 said means including means for feeding a gas under pressure through said holes.

7. An arresting gear according to claim 1, wherein another box wall is provided with holes distributed along practically the whole length of said last mentioned box wall,
 said means including means for sucking out gas through said holes from the space of said box limited by said last mentioned box wall.

References Cited

UNITED STATES PATENTS 3,057,440  10/1962  Broudo _____ 188—86
3,200,906  8/1965  Bernard _____ 244—110 XR MILTON BUCHLER, Primary Examiner PAUL E. SAUBERER, Assistant Examiner U.S. Cl. X.R.

188—65.1, 86